(12) United States Patent
Booysen

(10) Patent No.: US 10,685,495 B1
(45) Date of Patent: Jun. 16, 2020

(54) ENTERPRISE MODELING, INSTRUMENTATION, AND SIMULATION SYSTEM

(71) Applicant: Cornelis Booysen, Franklin, TN (US)

(72) Inventor: Cornelis Booysen, Franklin, TN (US)

( * ) Notice: Subject to any disclaimer, the term of this patent is extended or adjusted under 35 U.S.C. 154(b) by 0 days.

(21) Appl. No.: 16/204,137

(22) Filed: Nov. 29, 2018

Related U.S. Application Data

(60) Provisional application No. 62/593,786, filed on Dec. 1, 2017.

(51) Int. Cl.

| | |
|---|---|
| G06T 19/00 | (2011.01) |
| G06T 17/20 | (2006.01) |
| G06F 3/01 | (2006.01) |
| G06T 15/00 | (2011.01) |
| G06F 3/0481 | (2013.01) |
| G06F 30/20 | (2020.01) |

(52) U.S. Cl.
CPC ............ *G06T 19/006* (2013.01); *G06F 3/011* (2013.01); *G06F 3/04815* (2013.01); *G06F 30/20* (2020.01); *G06T 15/00* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 2006/0009755 | A1* | 1/2006 | Sra ..................... | A61B 18/1492 606/32 |
| 2011/0264710 | A1* | 10/2011 | Arunagiri .......... | G06Q 10/0639 707/805 |
| 2015/0035823 | A1* | 2/2015 | Arsan ................... | G06T 11/206 345/419 |
| 2019/0129607 | A1* | 5/2019 | Saurabh .............. | G06F 3/04847 |

* cited by examiner

*Primary Examiner* — Frank S Chen
(74) *Attorney, Agent, or Firm* — John Rizvi; John Rizvi, P.A.—The Patent Professor

(57) ABSTRACT

A three-dimensional virtual reality modeling system is disclosed. The three-dimensional virtual reality modeling system preferably comprises an enterprise architecture modeler, a system monitor, a visual simulator, and an information display augmenter. Such a system can create virtual artifacts representing physical components of an enterprise system in a three-dimensional space and can display relevant metrics over each artifact, allowing a system engineer to efficiently monitor and maintain the system. Such a system further comprises familiar audio and visual cues to alert the engineer to faults in the system and aid in the localization of such faults.

18 Claims, 14 Drawing Sheets

ENTERPRISE MODELING, INSTRUMENTATION, AND SIMULATION SYSTEM

CROSS-REFERENCE TO RELATED APPLICATION

This application claims the benefit of U.S. Provisional Patent Application Ser. No. 62/593,786, filed Dec. 1, 2017, which is incorporated herein in its entirety.

FIELD OF THE INVENTION

The present invention relates generally to virtual reality modeling, and more particularly to an enterprise modeling, instrumentation, and simulation system

BACKGROUND OF THE INVENTION

Current trends in enterprise software development have moved towards the increased use of remote data storage and virtual application technologies. Such technologies are, for most individuals, complicated abstract designs that are difficult to visualize and comprehend. Even for those individuals familiar with a particular system, the mental map that one has of the system will likely vary from the map that any other user of the system may have. System architects, administrators, and users may all view the system in different ways, potentially leading to miscommunications and mistakes in an increasingly complex computing environment. The result of such complexity is that entrustment of complicated enterprise systems must be given to those individuals capable of understanding such systems, potentially taking the management and decision-making power out of the hands of more appropriate personnel.

Architectural models run far behind current system topology due to the sheer workload of maintaining several architecture viewpoints—a stopgap solution to avoid diagrams from getting too complex. Application simulation has been rendered down to testing smaller and smaller units of work because the complexity of having true end-to-end application and integration simulation has become unfeasible due to the complexity of the interconnectivity of the average enterprise. Those enterprises that do run their own computer centers, as well as cloud vendors, are tasked with maintaining a mapping between the physical and abstract components of an application. Failing to have an up to date mapping might result in the wrong system being shut down due to hardware maintenance or, even worse, the wrong system being shut down during emergencies like security breaches by hacking attacks.

It is known to have two-dimensional computer programs for modeling enterprise systems. While such two-dimensional systems may provide a consistent map of a system's architecture, such systems largely fail to accurately and consistently reflect true enterprise systems due to the limitations inherent in working with only two dimensions. Therefore, current computing systems are lacking needed features to accurately and effectively model an enterprise system.

Therefore, there is a need in the art of computing technology for a three-dimensional computer program for modeling enterprise systems that will accurately represent physical, abstract, and motivational aspects of enterprise data centers, combined with visual and audible cues to alert system administrators about failing systems, performance problems, and the knock-on effect of system or hardware failures on other systems.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a three-dimensional virtual reality modeling system is disclosed. Particularly, the system comprises an enterprise architecture modeler, a system monitor, a visual simulator, and an information display augmenter. The system displays in three dimensions a virtual representation of an enterprise system architecture, and provides audio and visual cues of system faults.

In one aspect, the three-dimensional virtual reality modeling system may create artifacts with semantic meaning in three-dimensional space.

In another aspect, the three-dimensional virtual reality modeling system may connect artifacts with semantic meaning to other similar artifacts.

In another aspect, the three-dimensional virtual reality modeling system may assign semantic meaning to the relationship that the connections between artifacts represent.

In another aspect, the three-dimensional virtual reality modeling system may form an aggregation of artifacts with semantic meaning in a virtual three-dimensional world that represent a larger entity in real life.

In another aspect, the three-dimensional virtual reality modeling system may serialize artifacts with semantic meaning into a portable file format.

In another aspect, the three-dimensional virtual reality modeling system may import and de-serialize files that contain information about entities with semantic meaning, and create from this information a virtual three-dimensional model with artifacts and relationships with semantic meaning.

In another aspect, the three-dimensional virtual reality modeling system may calculate the positioning of artifacts with semantic meaning into various formations in three-dimensional space.

In another aspect, the three-dimensional virtual reality modeling system may visually display normal state conditions of artifacts with semantic meaning in a three-dimensional space.

In another aspect, the three-dimensional virtual reality modeling system may visually display abnormal or faulty conditions of artifacts with semantic meaning in a three-dimensional space.

In another aspect, the three-dimensional virtual reality modeling system may provide audible cues to the normal state conditions of artifacts within the system.

In another aspect, the three-dimensional virtual reality modeling system may provide audible cues to the abnormal or faulty conditions of artifacts within the system.

In another aspect, the three-dimensional virtual reality modeling system may provide tactile or vibrational feedback of normal state conditions within the system.

In another aspect, the three-dimensional virtual reality modeling system may provide tactile or vibrational feedback of abnormal or faulty conditions within the system.

In another aspect, the three-dimensional virtual reality modeling system may provide audible, visual, or tactile cues within the proximity of a system fault, to aid in repairs.

In another aspect, the three-dimensional virtual reality modeling system may allow for the simulation of system faults or inefficiencies while the system continues to operate normally.

In another aspect, the three-dimensional virtual reality modeling system may allow for the augmented display of semantic information about physical entities to aid in system monitoring and repairs.

In another example, disclosed is a user interface system for improving computer technology by semantically displaying information relating to components of a real-world computing system, the user interface system comprising one or more storage machines holding instructions executable by one or more logic machines to:

according to a user's field-of-view, display to a user at least one of a real-time-updated connection and a real-time-updated state of one or more components of the real-world computing system.

In another aspect, at least one of a real-time-updated connection and a real-time-updated state of one or more components of the real-world computing system are represented in a virtual 3D space, and the at least one of a real-time-updated connection and a real-time-updated state of one or more components of the real-world computing system are represented by a semantic representation.

In another aspect, the connection is configured to at least one of flex and wrap around objects in three dimensions.

In another aspect, three dimensional models of the at least one of a real-time-updated connection and a real-time-updated state of one or more components of the real-world computing system are exportable in a wire format language.

In another aspect, representations of the at least one of a real-time-updated connection and a real-time-updated state of one or more components of the real-world computing system are manipulable by a user using at least one of virtual reality technology and augmented reality technology.

In another aspect, representations of the at least one of a real-time-updated connection and a real-time-updated state of one or more components of the real-world computing system are configured to be identifiable from at least two different fields of view of a user.

In another aspect, the instructions are further executable to:

using data extrapolated from an external file, apply a pre-determined set of rules to calculate relative and optimum positions for representations of the at least one of a real-time-updated connection and a real-time-updated state of one or more components of the real-world computing system.

In another aspect, the real-time-updated state is represented by an overlay overlaid over the one or more components of the real-world computing system.

In another aspect, the instructions are further executable to communicate at least one of an audio alert, a visual alert, and a haptic alert to warn a user of a fault in the real-world computing system.

In another aspect, an avatar having artificial intelligence detects faults in the real-world computing system by patrolling areas of the real-world computing system, where the avatar and its real-time-updated position is displayed to a user, relative to at least one of a real-time-updated connection and a real-time-updated state of one or more components of the real-world computing system.

In another aspect, the instructions are further executable to communicate an alert to a user, where the alert identifies a fault, and where the alert is localized to at least one of a point of view of the user and location of the user with respect to locations of the at least one of a real-time-updated connection and a real-time-updated state of one or more components of the real-world computing system.

In another aspect, the at least one of a real-time-updated connection and a real-time-updated state of one or more components of the real-world computing system displays at least one of a real-time-updated flow and real-time updated volume of business transactions occurring in the real-world computing system.

In another aspect, an alert is communicated when the at least one of a real-time-updated flow and real-time updated volume of business transactions occurring in the real-world computing system reaches a threshold rate of transactions.

In another aspect, the instructions are further executable to run a simulation mode, where in the simulation mode, a fault is simulable for diagnostic purposes to cause connected at least one of a real-time-updated connection and a real-time-updated state of one or more components of the real-world computing system to change.

In another aspect, the at least one of a real-time-updated connection and a real-time-updated state of one or more components of the real-world computing system are displayable as an augmented reality overlay on one or more real-world physical components of the real-world computing system.

In another aspect, the one or more components of the real-world computing system are virtually representable.

In another aspect, manipulating the at least one of a real-time-updated connection and a real-time-updated state of one or more components of the real-world computing system causes programming of the one or more components of the real-world computing system to change.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the relative position of components in relation to the geometric center of the invention. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

"MindPalace" is a term used to indicate a virtual 3-D space that contains semantic information about a real life scenario, system, or interaction between physical, logical, motivational, or other abstract entities and concepts. The MindPalace is a picture about reality in a virtual system that visually represents spatial orientations or connections between the various components of the system. Whereas the possibility always exists that humans might have an erroneous picture of a system in their minds, the MindPalace will represent the single correct version of the true reality of the system.

"Semantic information" is the virtual representation of entities or concepts that exist in real life. Such entities or concepts may include single physical hardware components or may also represent an aggregate of physical components designed to operate as a single unit. Such entities or concepts may also include electronic or virtual compositions or abstract concepts. For example, such an entity or concept may comprise a computer storage device, an application web cluster, a business goal, or any other appropriate thing.

Figure 1:
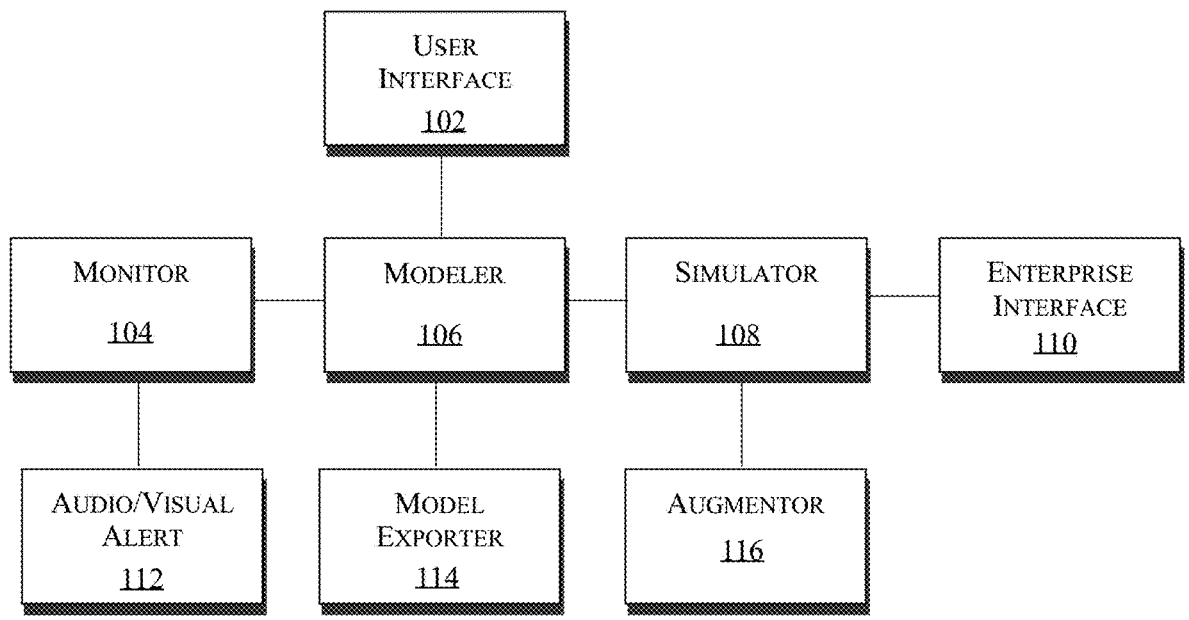
FIG. 1 schematically presents a three-dimensional virtual reality modeling system comprising an enterprise architecture modeler, a system monitor, a visual simulator, an information display augmenter, a model exporter, and a plurality of audio and visual alert and notification systems.

The illustration of FIG. 1 schematically presents a three-dimensional virtual reality modeling system comprising an enterprise architecture modeler 106, a system monitor 104, a visual simulator 108, and an information display augmenter 116.

In some embodiments the enterprise architecture modeler 106 may allow architects to create three-dimensional models in a virtual world. Such a modeler may employ current gaming and image rendering technologies to create such models and provide the needed feature set to provide this functionality. An appropriate visual modeling language, such as Archimate, may be used to program the needed models. Archimate, though, is a primarily two-dimensional modeling language, and the various symbol sets may be adjusted to operate in a three-dimensional environment. In Archimate, the relationships between components may be reflected by various connectors. Such adjustments may include the modification of Archimate connectors to flex and wrap around objects in three dimensions. Such modeling also may be performed in a three-dimensional display shown on a standard computer monitor or in a virtual reality environment.

The modeler 106 may further comprise a model exporter 114, which may allow three-dimensional models created within the system to be exported in various wire format languages. The Archimate visual modeling language further comprises an exchange format that is commonly used in virtual reality modeling, known as the Archimate Model Exchange File Format. Such a file format does not necessarily require location or positioning information of the various artifacts, and so proprietary formulas may be implemented into the system for interpreting the positions of the various artifacts based on any locating information that is available. Other standard languages, such as OpenVRML, may also be utilized to transport models into the present system, though such languages are limited to static three-dimensional models.

Figure 3:
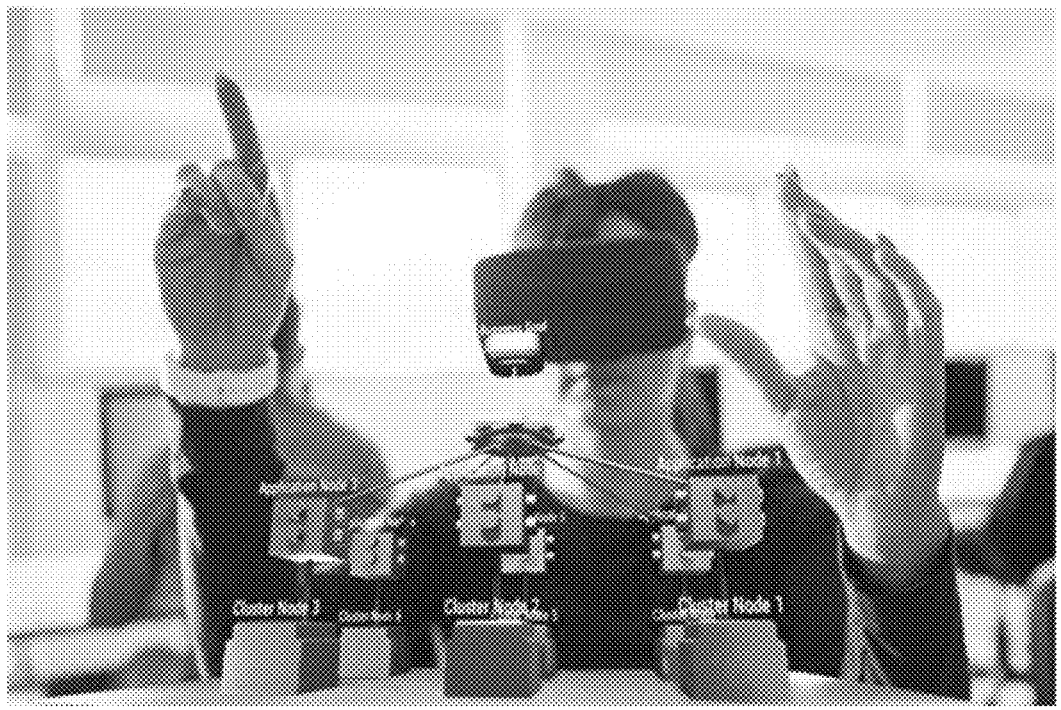
FIG. 3 visually presents an architect creating a three-dimensional model using virtual reality technology of the disclosed system.
Figure 4:
FIG. 4 visually presents a three-dimensional architectural model created using official artifacts in a MindPalace.

The illustration of FIG. 3 shows 3D models containing 3D objects (i.e. artifacts) that represent original Archimate symbols, however these objects may be configured to easily relate to an object and/or model, regardless of the viewing angle. Particularly FIG. 3 shows a 3D model being created using VR technology. For example, FIGS. 6-13 show various objects that are configured such that they may be recognized as a specific object, from various angles.

A unique feature of the modeler 106 may be its ability to position in three-dimensional space any artifact with semantic meaning regardless of the amount of positioning information available in the external file. The modeler 106 may extrapolate from data in the external file, focusing on the number of relationships between various artifacts in the system and applying pre-set semantic rules and best practices to calculate relative and optimum positions for each of the artifacts in three-dimensional space. The modeler 106 may further comprise the ability to represent an artifact within an artifact in three-dimensions.

Figure 5:
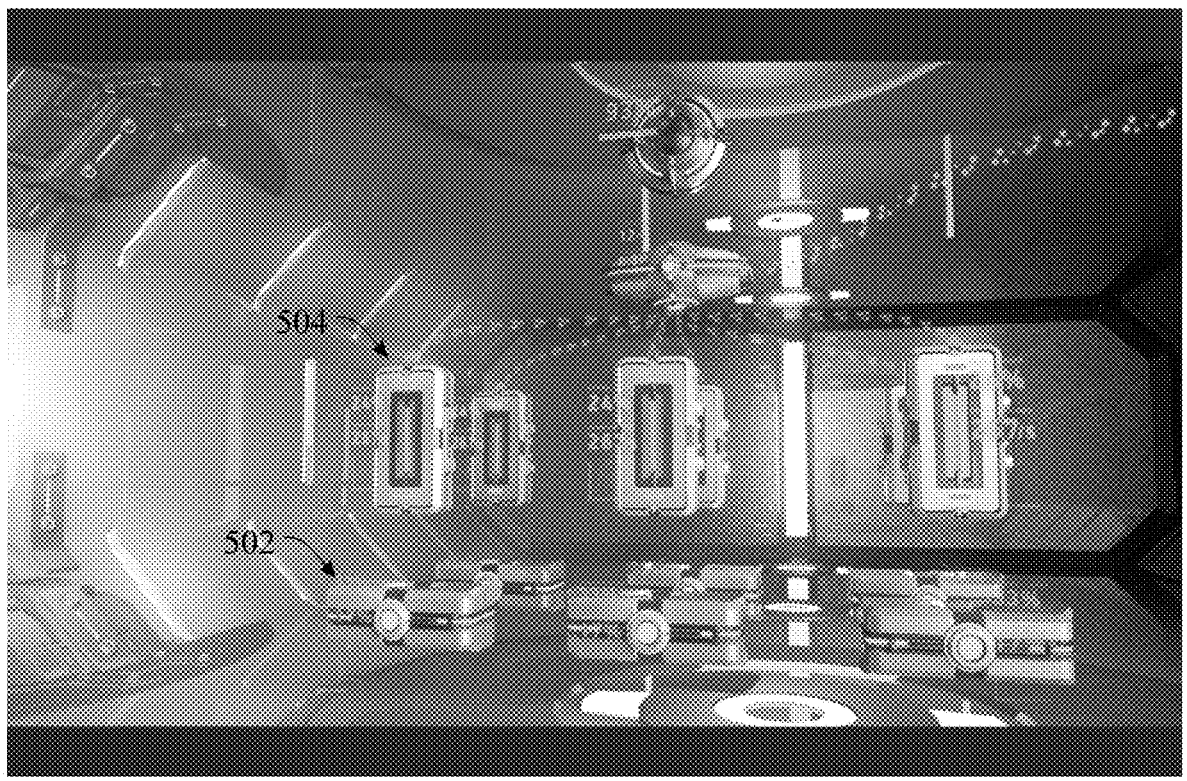
FIG. 5 visually presents a three-dimensional architectural model created using official artifacts in a MindPalace, shown with exemplary overlays.
Figure 6:
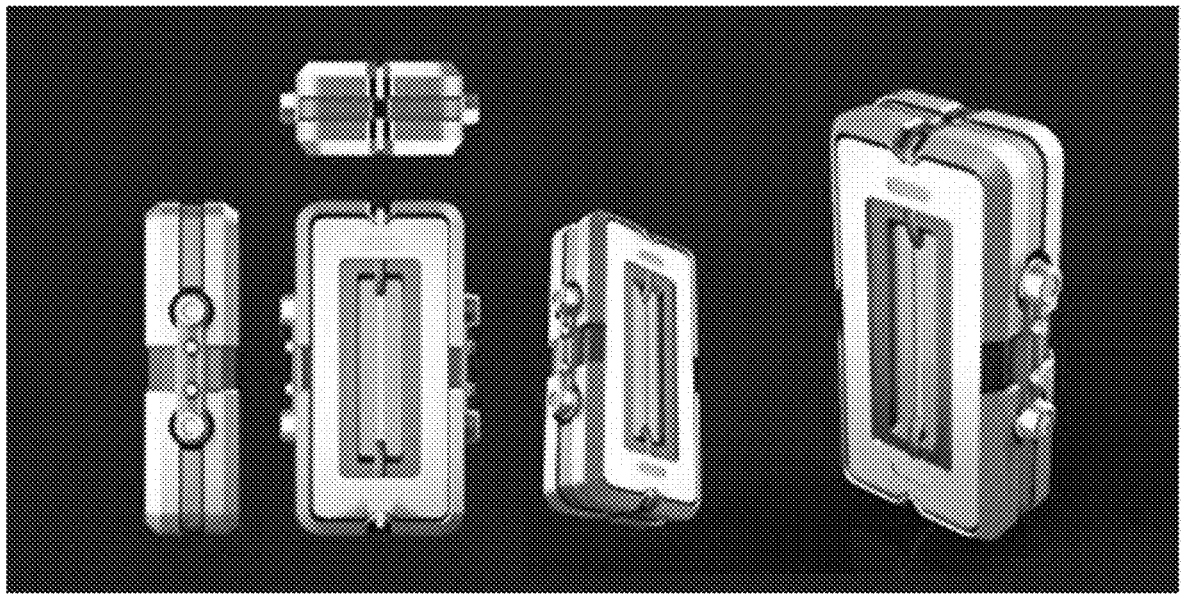
FIG. 6 visually presents an artifact that represents an application within the system.
Figure 7:
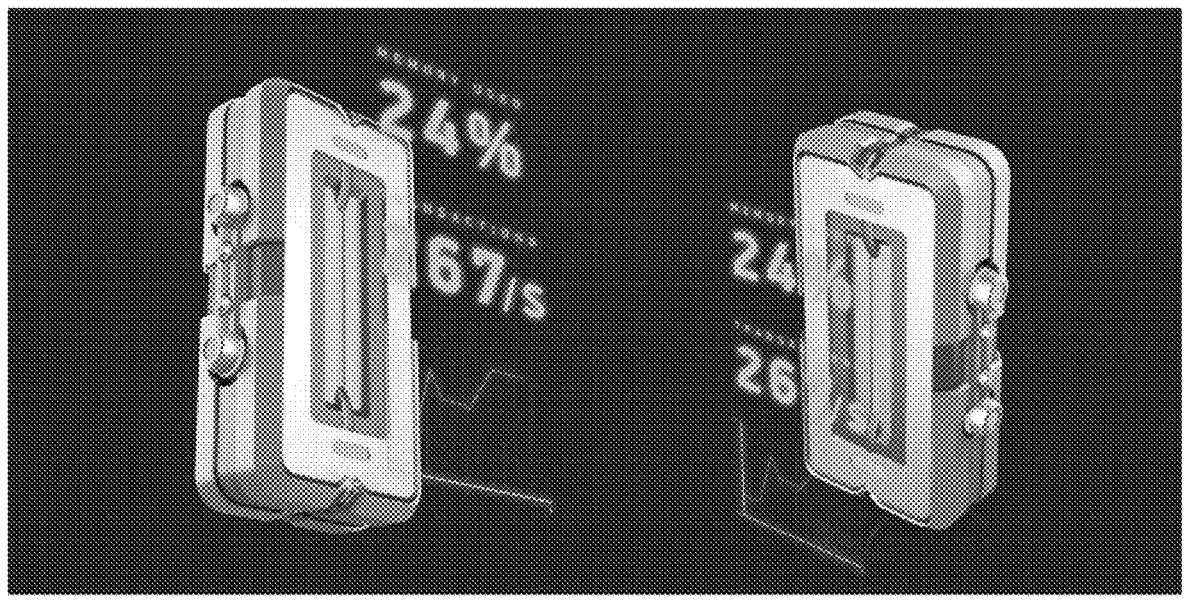
FIG. 7 visually presents an artifact that represents an application within the system, shown with exemplary overlays.
Figure 8:
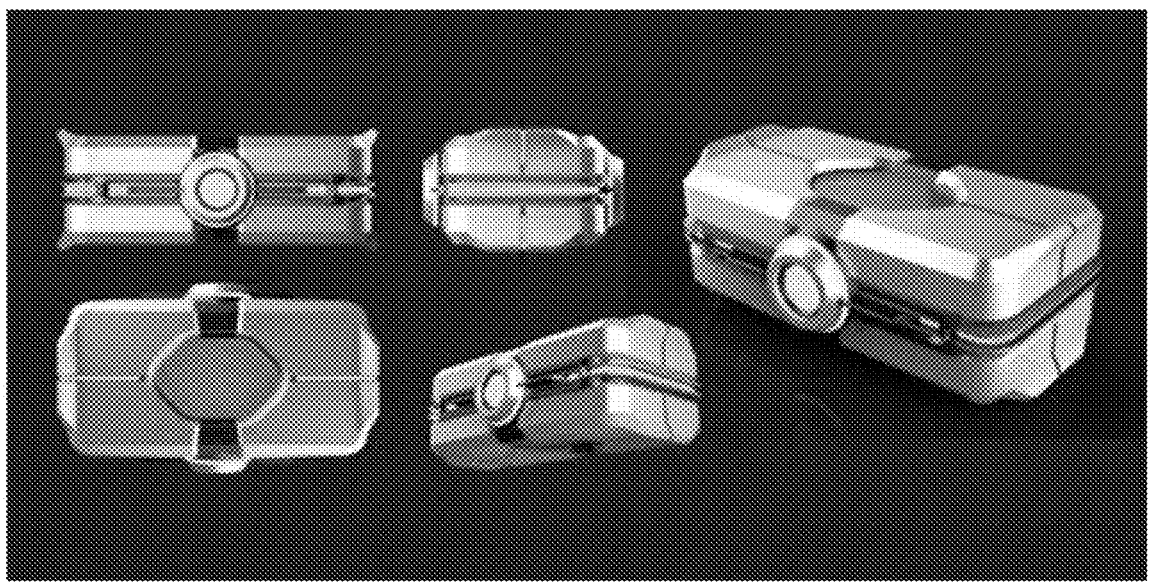
FIG. 8 visually presents an artifact that represents devices such as servers within the system.
Figure 9:
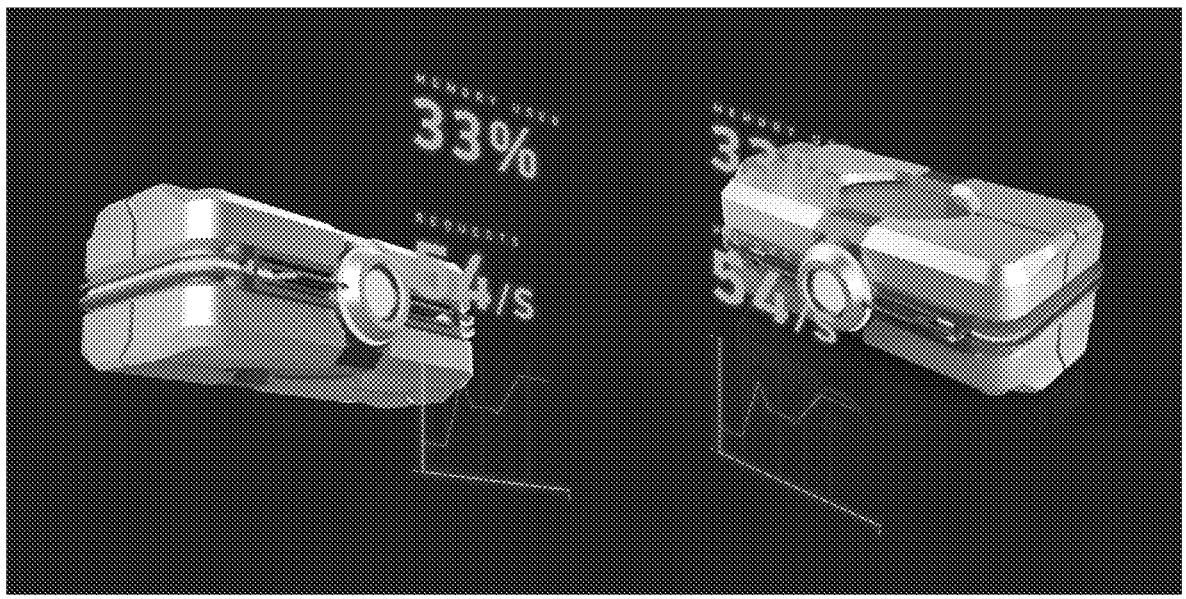
FIG. 9 visually presents an artifact that represents devices such as servers within the system, shown with exemplary overlays.
Figure 10:
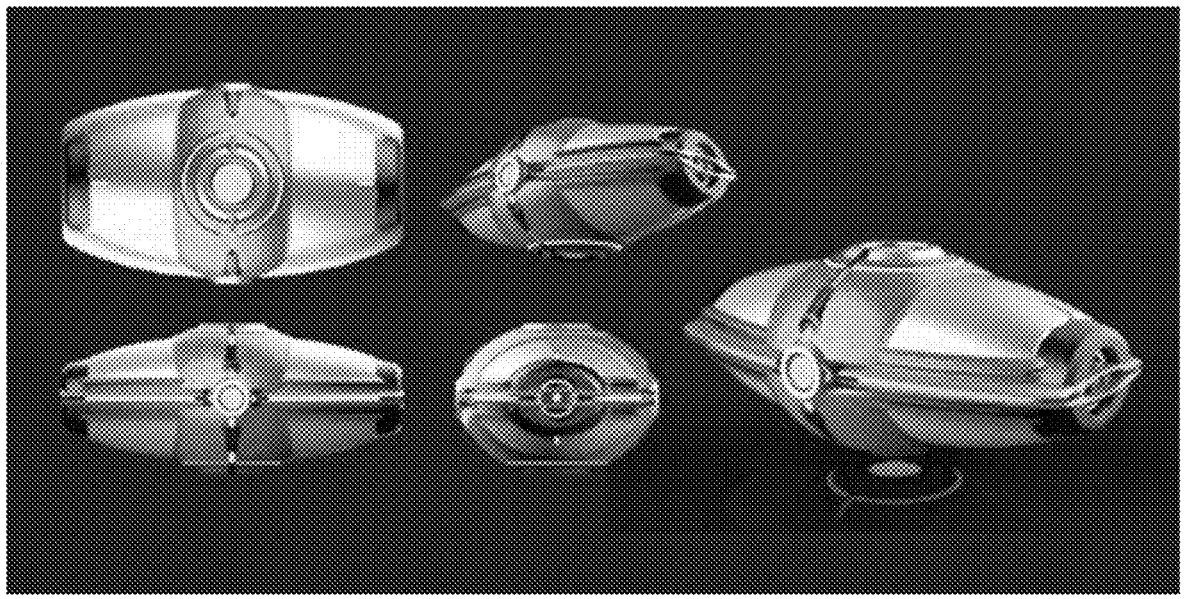
FIG. 10 visually presents an artifact that represents a business service within the system.
Figure 11:
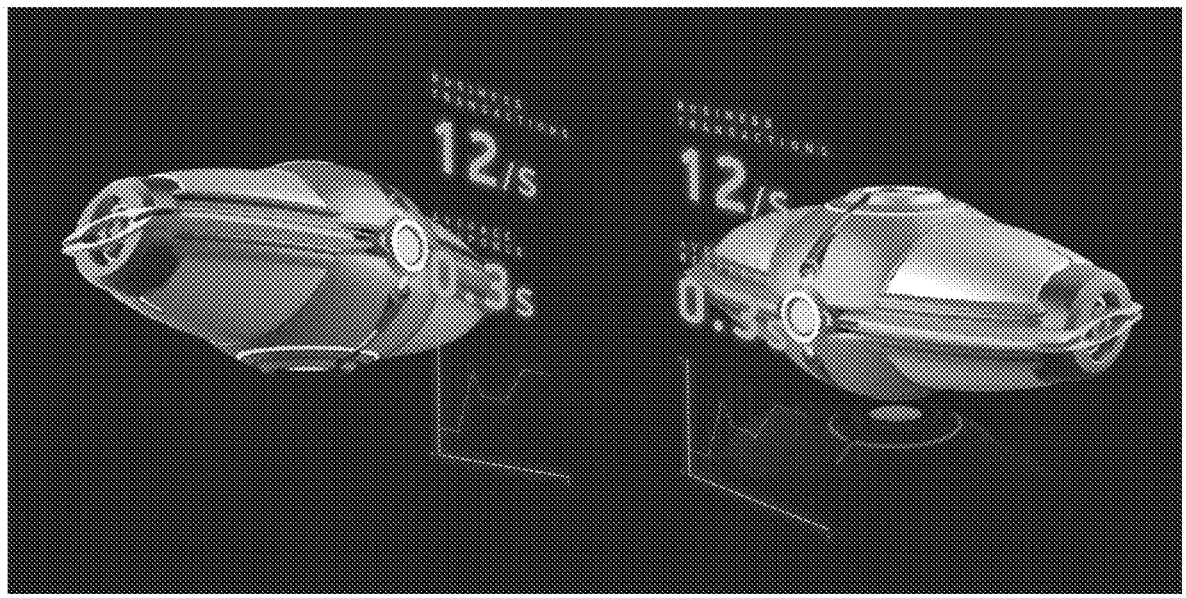
FIG. 11 visually presents an artifact that represents a business service within the system, shown with exemplary overlays.
Figure 12:
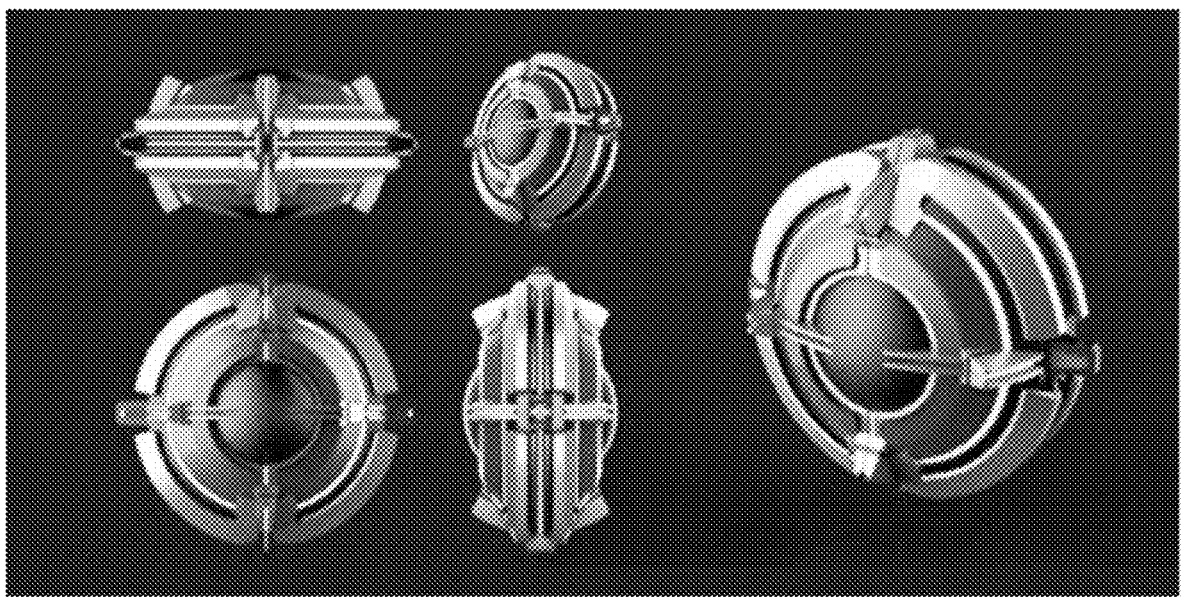
FIG. 12 visually presents an artifact that represents a business goal within the system.
Figure 13:
FIG. 13 visually presents an artifact that represents a business goal within the system, shown with exemplary overlays.
Figure 14:
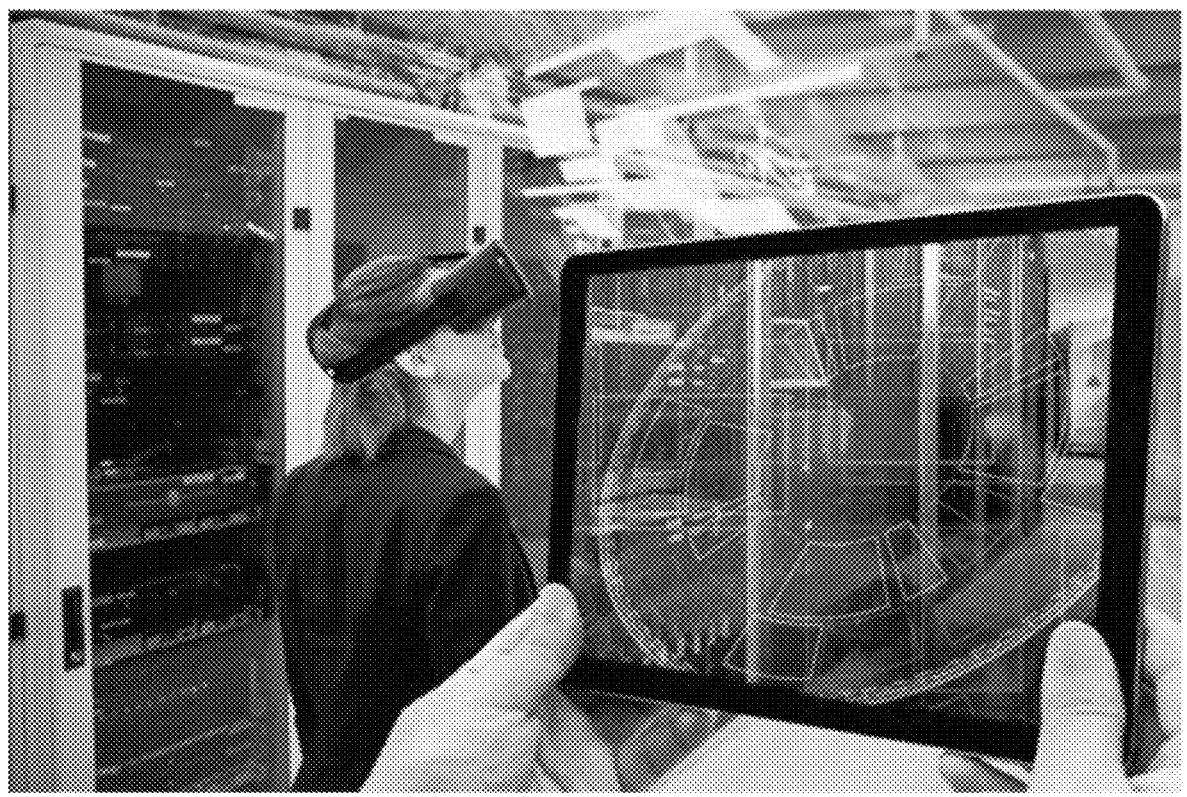
FIG. 14 visually presents two engineers making use of the augmentor of the system.

In some embodiments the system monitor 104 may add various objects to the architectural model maintained by the modeler 106. Various artifacts within the model may have reporting data and relevant information laid over the artifact to provide a quick reference display of vital information. As an example, an application object may have a graph or dial laid over the object to indicate the transaction throughput rate of the represented application, or a server object may have indicators to show the CPU or storage usage of the specific device. The illustration of FIG. 5 shows overlays 502 in a vicinity of an object or artifact 504.

The monitor 104 may further comprise an audio/visual alert 112, which may provide an audible or visible warning of faults within the modeled system, and may use various common alerts known to be familiar to human senses. The audio/visual alert 112 may comprise specific sound elements to accompany the visual display of metrics. The sound elements may be designed to convey alerts regarding various types of faults in system performance, including normal states and faulty states. To convey a normal state, the audio/visual alert 112 may produce a rhythmic or repeating sound pattern that may increase in cadence with increases in system load or throughput. Such a normal state sound output would be conceptually similar to the rhythmic sounds of a ship or train engine, to which a familiar captain or engineer may listen to hear a normal or abnormal condition. The audio/visual alert 112 may further convey an abnormal state by emitting sudden sharp sounds or alarms to draw the attention of a user monitoring the system. Such an abnormal alert sound may be similar to that used in a washing machine to alert of a completed cycle, as such a sound may be heard over the din of most background noises and draws the attention of those persons in the vicinity. The audio/visual alert 112 may further comprise a vibrating component to provide tactile feedback of specific alerts by the system. The vibrations may include tell-tale vibrations that have a time dependent pattern, for communicating or alerting specific problems.

Another aspect of the monitor 104 may comprise the use of avatars equipped with artificial intelligence to detect alerts. These avatars may be represented visually as artifacts within the MindPalace, and may be able to patrol certain areas and detect and relay alerts on behalf of a system user. Such alerts may be audible emitted through the audio/visual alert 112. Such alerts may further only be audible in the area in which the alert was triggered, and such a feature will allow alerts from the monitor 104 to remain localized in larger systems, as opposed to a user receiving a single alert to a fault that could be anywhere within the system. If all sound alerts can be heard from all locations within the system, for example, the user will be placed at high risk of missing certain faults or having a difficult time localizing the highest priority faults.

Another aspect of the audio/visual alert 112 may comprise a visual alert system that comprises bright lights or other special effect patterns associated with system faults. Such a visual cue may allow a system administrator to further localize the source of a fault alert once the audio alert has brought the administrator to the area of the fault. Such alerts, for example, may be represented by the monitor 104 as smoke or sparks being emitted from a faulty server overlay.

In some embodiments the visual simulator 108 may display metrics representing the flow of business transactions throughout the enterprise interface 110. Such a display may comprise, for example, a pipe or tube through which symbols or orders move at a variable rate representing the current volume of transactions. These displays may be easily recognized by system administrators for maintenance purposes by the use of various overlays from the Monitor 104. Such a display may, for example represent a fault or backup in the system by representing a slowed rate of transactions through the piping. The display may also show a complete stoppage of the objects in the piping to represent a failure of the enterprise order management system, coupled with a smoke or sparks display over the relevant artifact. A familiar administrator may quickly recognize such a slowing and take immediate action to repair such a fault.

A further advantage of the simulator 108 is that integration engineers may be able to test the effectiveness of various business transactions while immersed in the MindPalace. The flow of transactions combined with the metrics display by the Monitor 104 will allow a more advanced level of detection and interpretation than can be performed using two-dimensional models. The combination of displays and overlays may create an enhanced combination of data points that may allow for faster and more effective responses to system faults and inefficiencies than can be had in two-dimensions. Such engineers may further be able to simulate faults and inefficiencies in the system for diagnostic purposes while the system continues to operate underneath the simulated condition. This level of testing and analysis is extremely difficult to perform with current tools, as they tend to create non-familiar two-dimensional displays that are less efficient to interpret.

In some embodiments the information display augmenter 116 may display augmented reality views of any data center within an enterprise system. The augmenter 116 may work with the monitor 104 to create three-dimensional overlays that provide relevant information about each actual physical component of the system, and may be viewed through the use of a mobile computing device, such as a cell phone or tablet, simply by holding the device up in front of the physical component. Such a device may allow a system administrator to actually approach a physical component of the enterprise system and virtually view its operating metrics in real time, allowing for quick system checks and more efficient searches for system faults. As an example, such an augmented reality view may allow a system engineer to find a server that is not operating, based on the displayed metrics overlay, even though the server appears to be on and showing no physical faults.

In another example, manipulating connections or states that are displayed by the system, causes programming of components of the real-world computing system to change. For example, if a fault is represented by an augmented or virtual reality indicator, a user may work within that augmented or virtual reality to manipulate the programming of the faulty component to fix a problem, or to generally adjust the functionality of real-world, physical, components. For example, various sliders or menu options may be presented to a user, such that the user may manipulate these sliders or menu options to adjust the real-world functionality of the components.

Figure 2:
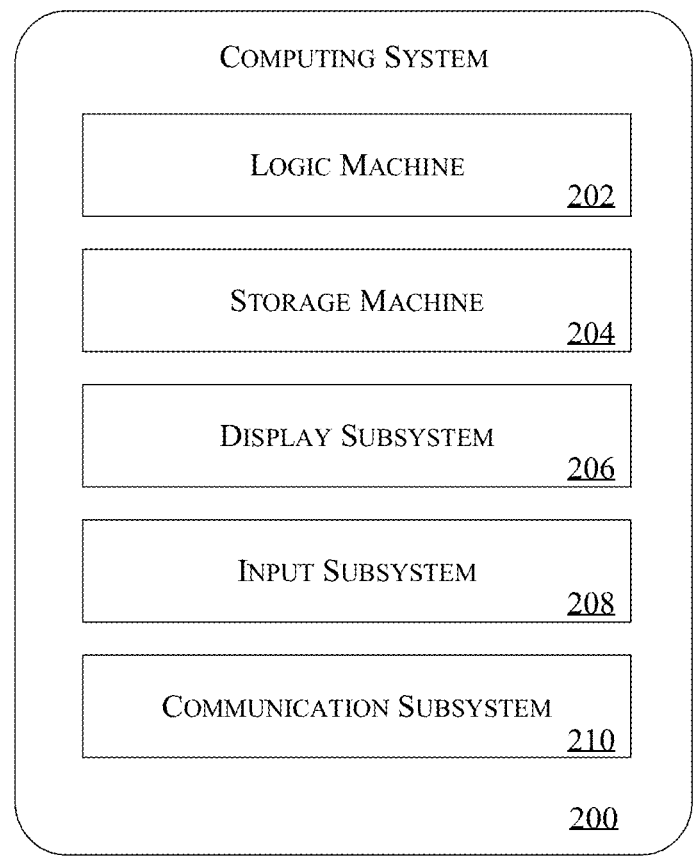
FIG. 2 schematically presents an example computing system for carrying out the herein disclosed tasks and processes.

The illustration of FIG. 2 schematically shows a non-limiting exemplary embodiment of a computing system 200 that can enact the system described above. Computing system 200 may be any appropriate computing device such as a personal computer, tablet computing device, gaming device or console, mobile computing device, etc. Computing system 200 includes a logic machine 202 and a storage machine 204. Computing system 200 may include a display subsystem 206, input subsystem 208, and communication subsystem 210. Logic machine 202 may execute machine-readable instructions via one or more physical devices. For example, the logic machine 202 may be configured to execute instructions to perform tasks for a computer program. The logic machine may include one or more processors to execute machine-readable instructions. Storage machine 204 includes one or more physical devices configured to hold or store instructions executable by the logic machine. When such methods and processes are implemented, the state of storage machine 204 may be changed to hold different data. For example, storage machine 204 may include memory devices such as various hard disk drives or CD or DVD devices. Display subsystem 206 may visually present data stored on storage machine 204. For example, display subsystem 206 may visually present data to form a graphical user interface (GUI) 102 (FIG. 1). Input subsystem 208 may be configured to connect and receive input from devices such as a mouse, keyboard, or gaming controller. Communication subsystem 210 may be configured to enable computing system 200 to communicate with other computing devices. Communication subsystem 210 may include wired and/or wireless communication devices to facilitate networked communication.

In conclusion, provided is a three-dimensional virtual reality modeling system comprising, at least, an enterprise architecture modeler, a system monitor, a visual simulator, and an information display augmenter. Further, provided is a three-dimensional virtual reality modeling system designed to provide constant monitoring of an enterprise software system and to alert a system administrator to various normal and abnormal states within the system using familiar audio and visual cues. The system may create artifacts with semantic meaning in three-dimensional space, connect artifacts with semantic meaning to other similar artifacts, assign semantic meaning to the relationship that the connections between artifacts represent, form an aggregation of artifacts with semantic meaning in a virtual three-dimensional world that represent a larger entity in real life, serialize artifacts with semantic meaning into a portable file format, import and de-serialize files that contain information about entities with semantic meaning, and create from this information a virtual three-dimensional model with artifacts and relationships with semantic meaning, calculate the positioning of artifacts with semantic meaning into various formations in three-dimensional space, visually display normal state conditions of artifacts with semantic meaning in a three-dimensional space, visually display abnormal or faulty conditions of artifacts with semantic meaning in a three-dimensional space, may provide audible cues to the normal state conditions of artifacts within the system, provide audible cues to the abnormal or faulty conditions of artifacts within the system, may provide tactile or vibrational feedback of normal state conditions within the system, may provide tactile or vibrational feedback of abnormal or faulty conditions within the system, provide audible, visual, or tactile cues within the proximity of a system fault, to aid in repairs, allow for the simulation of system faults or inefficiencies while the system continues to operate normally, and/or allow for the augmented display of semantic information about physical entities to aid in system monitoring and repairs.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A user interface system for improving computer technology by semantically displaying information relating to components of a real-world computing system, the user interface system comprising one or more storage machines holding instructions executable by one or more logic machines to:
according to a user's field-of-view, display to a user at least one of a real-time-updated connection and a real-time-updated state of one or more components of the real-world computing system; and
wherein the instructions are further executable to:
using data extrapolated from an external file, apply a pre-determined set of rules to calculate relative positions for representations of the at least one of a real-time-updated connection and a real-time-updated state of one or more components of the real-world computing system.

2. The system of claim 1, wherein the at least one of a real-time-updated connection and a real-time-updated state of one or more components of the real-world computing system are represented in a virtual 3D space, and the at least one of a real-time-updated connection and a real-time-updated state of one or more components of the real-world computing system are represented by a semantic representation.

3. The system of claim 1, wherein the connection is configured to at least one of flex and wrap around objects in three dimensions.

4. The system of claim 1, wherein three dimensional models of the at least one of a real-time-updated connection and a real-time-updated state of one or more components of the real-world computing system are exportable in a wire format language.

5. The system of claim 1, wherein representations of the at least one of a real-time-updated connection and a real-time-updated state of one or more components of the real-world computing system are manipulable by a user using at least one of virtual reality technology and augmented reality technology.

6. The system of claim 1, wherein representations of the at least one of a real-time-updated connection and a real-time-updated state of one or more components of the real-world computing system are configured to be identifiable from at least two different fields of view of a user.

7. The system of claim 1, wherein the real-time-updated state is represented by an overlay overlaid over the one or more components of the real-world computing system.

8. The system of claim 1, wherein the instructions are further executable to communicate at least one of an audio alert, a visual alert, and a haptic alert to warn a user of a fault in the real-world computing system.

9. The system of claim 1, wherein the instructions are further executable to communicate an alert to a user, where the alert identifies a fault, and where the alert is localized to at least one of a point of view of the user and location of the user with respect to locations of the at least one of a real-time-updated connection and a real-time-updated state of one or more components of the real-world computing system.

10. The system of claim 1, wherein the at least one of a real-time-updated connection and a real-time-updated state of one or more components of the real-world computing system displays at least one of a real-time-updated flow and real-time updated volume of business transactions occurring in the real-world computing system.

11. The system of claim 1, wherein the at least one of a real-time-updated connection and a real-time-updated state of one or more components of the real-world computing system displays at least one of a real-time-updated flow and real-time updated volume of business transactions occurring in the real-world computing system, wherein an alert is communicated when the at least one of a real-time-updated flow and real-time updated volume of business transactions occurring in the real-world computing system reaches a threshold rate of transactions.

12. The system of claim 1, wherein the instructions are further executable to run a simulation mode, where in the simulation mode, a fault is simulatable for diagnostic purposes to cause connected at least one of a real-time-updated connection and a real-time-updated state of one or more components of the real-world computing system to change.

13. The system of claim 1, wherein the at least one of a real-time-updated connection and a real-time-updated state of one or more components of the real-world computing system are displayable as an augmented reality overlay on one or more real-world physical components of the real-world computing system.

14. The system of claim 1, wherein the one or more components of the real-world computing system are virtually representable.

15. The system of claim 1, wherein manipulating the at least one of a real-time-updated connection and a real-time-updated state of one or more components of the real-world computing system causes programming of the one or more components of the real-world computing system to change.

16. A user interface system for improving computer technology by semantically displaying information relating to components of a real-world computing system, the user interface system comprising one or more storage machines holding instructions executable by one or more logic machines to:
   according to a user's field-of-view, display to a user at least one of a real-time-updated connection and a real-time-updated state of one or more components of the real-world computing system; and
   wherein an avatar having artificial intelligence detects faults in the real-world computing system by patrolling areas of the real-world computing system, where the avatar and its real-time-updated position is displayed to a user, relative to at least one of a real-time-updated connection and a real-time-updated state of one or more components of the real-world computing system.

17. The system of claim 16, wherein the at least one of a real-time-updated connection and a real-time-updated state of one or more components of the real-world computing system are represented in a virtual 3D space, and the at least one of a real-time-updated connection and a real-time-updated state of one or more components of the real-world computing system are represented by a semantic representation.

18. A user interface system for improving computer technology by semantically displaying information relating to components of a real-world computing system, the user interface system comprising one or more storage machines holding instructions executable by one or more logic machines to:
   according to a user's field-of-view, display to a user at least one of a real-time-updated connection and a real-time-updated state of one or more components of the real-world computing system;
   wherein the at least one of a real-time-updated connection and a real-time-updated state of one or more components of the real-world computing system are represented in a virtual 3D space, and the at least one of a real-time-updated connection and a real-time-updated state of one or more components of the real-world computing system are represented by a semantic representation;
   wherein the connection is configured to at least one of flex and wrap around objects in three dimensions;
   wherein three dimensional models of the at least one of a real-time-updated connection and a real-time-updated state of one or more components of the real-world computing system are exportable in a wire format language;
   wherein representations of the at least one of a real-time-updated connection and a real-time-updated state of one or more components of the real-world computing system are manipulable by a user using at least one of virtual reality technology and augmented reality technology;
   wherein representations of the at least one of a real-time-updated connection and a real-time-updated state of one or more components of the real-world computing system are configured to be identifiable from at least two different fields of view of a user;
   wherein the instructions are further executable to:
   using data extrapolated from an external file, apply a pre-determined set of rules to calculate relative positions for representations of the at least one of a real-time-updated connection and a real-time-updated state of one or more components of the real-world computing system;
   wherein the real-time-updated state is represented by an overlay overlaid over the one or more components of the real-world computing system;
   wherein the instructions are further executable to communicate at least one of an audio alert, a visual alert, and a haptic alert to warn a user of a fault in the real-world computing system;
   wherein an avatar having artificial intelligence detects faults in the real-world computing system by patrolling areas of the real-world computing system, where the avatar and its real-time-updated position is displayed to a user, relative to at least one of a real-time-updated connection and a real-time-updated state of one or more components of the real-world computing system;
   wherein the instructions are further executable to communicate an alert to a user, where the alert identifies a fault, and where the alert is localized to at least one of a point of view of the user and location of the user with respect to locations of the at least one of a real-time-updated connection and a real-time-updated state of one or more components of the real-world computing system;
   wherein the at least one of a real-time-updated connection and a real-time-updated state of one or more components of the real-world computing system displays at least one of a real-time-updated flow and real-time updated volume of business transactions occurring in the real-world computing system;
   wherein an alert is communicated when the at least one of a real-time-updated flow and real-time updated volume of business transactions occurring in the real-world computing system reaches a threshold rate of transactions;
   wherein the instructions are further executable to run a simulation mode, where in the simulation mode, a fault is simulatable for diagnostic purposes to cause connected at least one of a real-time-updated connection and a real-time-updated state of one or more components of the real-world computing system to change;

wherein the at least one of a real-time-updated connection and a real-time-updated state of one or more components of the real-world computing system are displayable as an augmented reality overlay on one or more real-world physical components of the real-world computing system;

wherein the one or more components of the real-world computing system are virtually representable; and wherein manipulating the at least one of a real-time-updated connection and a real-time-updated state of one or more components of the real-world computing system causes programming of the one or more components of the real-world computing system to change; and wherein the instructions are further executable to:

using data extrapolated from an external file, apply a pre-determined set of rules to calculate relative positions for representations of the at least one of a real-time-updated connection and a real-time-updated state of one or more components of the real-world computing system.

* * * * *